(12) United States Patent
Schwabe et al.

(10) Patent No.: US 11,837,958 B2
(45) Date of Patent: *Dec. 5, 2023

(54) MULTIPHASE POWER CONVERTER

(71) Applicant: INFINEON TECHNOLOGIES AUSTRIA AG, Villach (AT)

(72) Inventors: Benjamin L. Schwabe, Munich (DE); Jens A. Ejury, Fremont, CA (US); Sandro Cerato, Taufkirchen (DE)

(73) Assignee: Infineon Technologies Austria AG, Villach (AT)

( * ) Notice: Subject to any disclaimer, the term of this patent is extended or adjusted under 35 U.S.C. 154(b) by 128 days.

This patent is subject to a terminal disclaimer.

(21) Appl. No.: 16/217,580

(22) Filed: Dec. 12, 2018

(65) Prior Publication Data

US 2020/0195145 A1    Jun. 18, 2020

(51) Int. Cl.
*H02M 3/158* (2006.01)
*H02M 1/00* (2006.01)

(52) U.S. Cl.
CPC ........ *H02M 3/1584* (2013.01); *H02M 1/0009* (2021.05); *H02M 3/1586* (2021.05)

(58) Field of Classification Search
CPC ...... H02M 3/155; H02M 3/156; H02M 3/157; H02M 3/1584; H02M 3/285; H02M 2003/1586; H02M 1/007; H02M 1/0009; H02M 1/0012; H02M 1/0016; H02M 1/0019; H02M 1/0022; H02M 1/0025; H02M 3/02; H02M 3/04; H02M 3/145; H02M 3/1566; H02M 3/158; H02M 3/1586; H02M 3/1588; H02M 1/0003; H02M 1/0043; H02M 1/0067; H02M 1/36; H02M 7/23; G06F 1/26; G06F 1/263; G06F 1/32; G06F 1/3203; G06F 1/3206
USPC ........ 323/222–226, 266, 271–280, 282–285, 323/299, 300, 351; 363/65–72
See application file for complete search history.

(56) References Cited

U.S. PATENT DOCUMENTS

| | | | |
|---|---|---|---|
| 10,355,584 B1 * | 7/2019 | Oak | H02M 1/088 |
| 10,700,605 B1 * | 6/2020 | Schwabe | G06N 20/00 |
| 2002/0118001 A1 * | 8/2002 | Duffy | H02J 1/102 |
| | | | 323/283 |

(Continued)

FOREIGN PATENT DOCUMENTS

CN    102624006 B    10/2013

OTHER PUBLICATIONS

H. Maruta et al., "Transient Characteristics of DC-DC Converter with PID Parameters Selection and Neural Network Control", IEEE, 2014, pp. 447-452. (Year: 2014).*

(Continued)

*Primary Examiner* — Thienvu V Tran
*Assistant Examiner* — Carlos O Rivera-Perez
(74) *Attorney, Agent, or Firm* — Armis IP Law, LLC

(57) ABSTRACT

A multiphase power converter comprises a regulator, a value-supply system arranged for collecting at least one operating point of the power converter, and a predictor for determining updated phase statuses, for activating or deactivating each of the phases ($11_1$, $11_2$, $11_3$, . . . ) during a further operation of the power converter. The updated phase statuses are determined using a process based on the at least one collected operating point and predictor parameters obtained from a machine-learning process.

38 Claims, 8 Drawing Sheets

(56) References Cited

U.S. PATENT DOCUMENTS

| | | | |
|---|---|---|---|
| 2007/0096704 A1* | 5/2007 | Jain | H02M 3/157 323/282 |
| 2007/0236192 A1* | 10/2007 | Vo | H02M 3/157 323/282 |
| 2007/0236197 A1* | 10/2007 | Vo | H02M 3/157 323/282 |
| 2011/0121795 A1 | 5/2011 | Vulih et al. | |
| 2012/0212193 A1* | 8/2012 | Sreenivas | H02M 3/1588 323/234 |
| 2013/0073104 A1 | 3/2013 | Sciacchitano | |
| 2016/0132084 A1* | 5/2016 | Solki | H02M 3/157 |
| 2017/0033726 A1 | 2/2017 | Yamamoto | |
| 2018/0052431 A1 | 2/2018 | Shaikh et al. | |
| 2019/0041948 A1* | 2/2019 | Kelly | G06F 1/26 |

OTHER PUBLICATIONS

Khomfoi, et al., "Fault Diagnosis and Reconfiguration for Multi-level Inverter Drive Using AI-Based Techniques", Dec. 1, 2007, IEEE Transactions on Industrial Electronics, vol. 54. No. 6, pp. 2954-2968. XP011196262.

Dupe, et al., "Accurate Power Loss Model of a Boost Cell in a Multiphase Converter for Phase Management", Aug. 26, 2014, 2014 16th European Conference on Power Electronics and Applications, IEEE, pp. 1-9, XP032651032.

Berasategi A, et al., "An adaptive control developed for Multi-Phase Converters based an look-up tables and applied to photovoltaic conversion systems", IECON 2012—38th Annual Conference on IEEE Industrial Electronics Society, IEEE, Oct. 25, 2012, pp. 904-909, XP032281491.

Tanaka, et al., "A Sample-based Approach to lookup Table Construction by SVM Active Learning", 2005 IEEE International Conference on Robotics and Biomimetics—Robio Shatin, N.T. China Jul. 5, 2005, Piscataway, NJ, Technicalfields USA, IEEE, Searched (IPC) Jan. 1, 2005, pp. 628-633, XP031001645.

EP Extended Search Report, EP 19215255.1, dated May 8, 2020, pp. 1-16.

Ahn, et al., "A Multiphase Buck Converter With a Rotating Phase-Shedding Scheme for Efficient Light-Load Control", IEEE Journal of Solid-State Circuits, vol. 49, No. 11, Nov. 11, 2014, pp. 2673-2683, XP0555634.

Office Action, EP 19215255.1, dated Jun. 10, 2021, pp. 1-7.

\* cited by examiner

MULTIPHASE POWER CONVERTER

BACKGROUND

Electrical power converters, in particular DC-DC power converters, are widely used because of their high efficiency and the small amounts of area/volume consumed by such converters. Among them, multiphase DC-DC power converters are particularly well suited for providing high currents at low voltages such as those needed by highly integrated electronic components such as microprocessors, graphic processors, network processors, etc.

In a general manner, a conventional multiphase power converter typically includes several converter branches that are called phases. The phases are typically connected in parallel for supplying a common load with respective phase currents. Thus, the output current supplied by the multiphase power converter to the load is the sum of the phase currents.

Current generations of processors such as CPUs or GPUs have a very high ratio of peak power to idle power demand. Then, DC-DC power converters that are used to supply power to such processors need to perform well for a large variety of load profiles. To this end, it is known to dynamically adapt the number of the phases of the power converter that are active simultaneously as a function of the output power which is desired at one time, so as to optimize the performance of the converter whatever the level of output power. Such adaptation of the number of active phases is sometimes referred to as phase adding and dropping in the art, or more generally phase shedding.

So-called auto-phasing relates to such variations in the number of active phases which are controlled by comparing the output current with thresholds. But auto-phasing may not be appropriate for some variation behaviors of the output current, such as toggling output current for example. Indeed, the number of active phases may be decreased whereas energy is still to be supplied from one phase which has just been dropped. Then the system may potentially be prone to being unstable. In addition, auto-phasing often implements a delay, called re-balancing time, requiring a decrease of the output current below a threshold, before reducing the number of active phases. This avoids phase dropping for very short durations, but it reduces the benefits of phase shedding and may even inhibit adapting the number of active phases if the output current varies too rapidly.

Auto-phasing is not appropriate either when certain requirements apply to the output current such as large slew rate. Increasing the number of active phases may be necessary for meeting such requirements, although only considering power-savings would lead to operate with the minimum number of active phases.

BRIEF DESCRIPTION

In contrast to conventional techniques, embodiments herein include novel multiphase power converters, which are able to operate in an optimized manner with a larger number of output situations and requirements, including at least some of those cited above.

For meeting this objective or any other one, embodiments herein include an electrical power converter, which comprises a plurality of phases for providing an output current and an output voltage to a load, the output current and output voltage resulting from phase output currents and phase output voltages respectively provided by the phases. One implementation of the power converter further comprises:

- a regulator operative to selectively activate each of the phases during an operation of the power converter;
- a value-supply system operative to collect at least one operating point, each operating point relating to an instant of operation of the power converter and comprising measured values for the corresponding instant of operation, for one or more input parameters among an input current of the power converter, an input voltage of the power converter, phase input currents, phase input voltages, and/or for one or more output parameters among the output current, the output voltage, the phase output currents, the phase output voltages, and/or at least one value of a target output voltage assigned to the same instant of operation of the power converter; and
- a predictor (implemented as hardware and/or software) operative to provide, for each phase of the plurality of phases, a respective updated phase status indicating that this phase is to be active or inactive, the updated phase statuses controlling activation of respective phases.

According to embodiments herein, the predictor is operative to determine the updated phase statuses using a process based on the at least one operating point collected by the value-supply system (i.e., monitor and value generator) and based on predictor parameters that are obtained from a machine-learning process.

Hence, embodiments herein include a new way of implementing phase shedding in an electrical power converter, by controlling the number of active phases using a machine-learning process.

Because the updated phase statuses are determined from measured values for one or more of the input current, input voltage, output current, output voltage and measured values related to the individual phases, actual conditions of the converter input power supply and of the converter load are taken into account during phase shedding. In addition, when these conditions are changing over time, the chained operation of the value-supply system and the predictor allows automatically modifying the phase statuses for fitting the number of active phases onto the new conditions. In particular, implementing a machine-learning process for updating the phase statuses allows improved fitting of the phase number over a wide range of operating schemes for the load, including the output current toggling rapidly between values which would correspond to numbers of active phases differing by more than two if each of these output current values were maintained continuously.

Furthermore, implementing a machine-learning process also allows automatic, rapid and possibly periodic update of the number of phases that are used for supplying the load with the desired power.

According to one embodiment, the predictor is operative to provide, for each phase when the corresponding updated phase status indicates that this phase is to be active, an updated value for an operation parameter of this phase. This updated value of the phase operation parameter is delivered to the regulator so that this updated value activates the phase of concern in a manner so as to match the updated value of the phase operation parameter. Optimal operation of each activated phase may be obtained via this improvement.

In accordance with further embodiments, the predictor is operable to determine the updated phase status for each phase based on a plurality of operating points which relate to successive instances of operation of the power converter, the plurality corresponding to a fixed number of operating points. In other words, in one embodiment, the predictor provides the updated phase statuses based on a history comprised of a fixed number of operating points. With such improvement, the predictor optimizes the operation of the power converter in a greater extent, in particular by anticipating changes to occur in the operation scheme of the load.

When the phase statuses are determined from a plurality of successive operating points, the predictor can be configured to implement a recurrent neural network, in particular a long short-term memory, so that each time a further operating point is supplied to the predictor by the value-supply system; this further operating point is added to the plurality of operating points used just before in a FIFO-queue manner, so as to obtain an updated plurality of operating points to be used for issuing a further updated phase status for each phase.

In one embodiment, one or more of the following additional features may be implemented advantageously, separately of in combination of several of them:
   the power converter can be configured as a DC-DC power converter or an AC-DC power converter;
   the predictor can be configured to include a lookup table for storing labelled training data, and comprise means for selecting one of these labelled training data as a nearest neighbor to the at least one operating point;
   the predictor can be configured to implement at least one calculation step of regression-type, in a calculation sequence used for issuing the updated status for each phase from the at least one operating point;
   the predictor can be configured to operate in a feed-forward artificial intelligence manner;
   the predictor can be configured to operate as a neural network, in particular for operating as a single-layer neural network; and
   the predictor can be configured as a neuromorphic chip.

Further embodiments herein enable a quick increase of the output current of the power converter while avoiding that a too low number of or a set of too few phases is activated for producing the converter output current to power a load. To this end the power converter may further comprise a module operable to determine a minimal number of phases to be activated based on the measured value for the converter output current in each of the at least one collected operating point. Then, the power converter may be adapted so that the updated phase statuses to be implemented by the regulator lead to a number of active phases which is at least equal to the minimal number of phases to be activated.

In accordance with further embodiments, a second aspect of this disclosure proposes a method for performing an electrical power conversion using a multiphase power converter, for providing an output current and an output voltage to a load, the output current and output voltage resulting from phase output currents and phase output voltages respectively provided by the phases, the method comprising:
   using a regulator, selectively activating each of the phases during the power conversion;
   collecting at least one operating point occurring during the power conversion, each collected operating point relating to an instant of operation during the power conversion and comprising measured values for the instant of operation for one or more input parameters among an input current of the power converter, an input voltage of the power converter, phase input currents, phase input voltages, and/or for one or more output parameters among the output current, the output voltage, the phase output currents, the phase output voltages, and at least one value of a target output voltage for the power conversion assigned to the instant of operation of the operating point; and
   using a predictor, providing an updated phase status for each respective phase of the plurality of phases, the updated phase status indicating whether to active the respective phase.

In accordance with further embodiments, each of the updated phase statuses is determined using a process based on the at least one collected operating point, and also based on predictor parameters that have been obtained from a machine-learning process.

Embodiments herein may further comprise the following preliminary steps /1/ to /3/ executed during the machine-learning process:
   /1/ gathering labeled training data that comprise training operating points and respective associated phase statuses for each phase;
   /2/ using the labeled training data for training a machine-learning model of the predictor, so as to obtain the predictor parameters to be used by the predictor for inferring each new updated phase status; and
   /3/ transmitting the predictor parameters to the predictor.

Then, the power conversion is operated using the predictor parameters transmitted in step /3/.

Preferably, step /2/ may be performed using computational means that are external to the power converter. Then, the computational means may be disconnected from the power converter so that this latter performs the power conversion without being connected any longer to the computational means.

Further method embodiments herein include the additional following steps:
   determining a minimal number of phases to be activated based on the measured value for the converter output current in each of the at least one collected operating point; and
   if the minimal number of phases to be activated is greater than a number of active phases resulting from the updated phase statuses as issued by the predictor, correcting at least one of the updated phase statuses as issued by the predictor so as to meet the minimal number of phases to be activated.

Then, the updated phase statuses for the plurality of phases which are further implemented by the regulator for performing the power conversion are those such that the number of active phases is at least equal to the minimal number of phases to be activated.

In accordance with still further embodiments, a power conversion performed according to embodiments herein may be implemented for supplying electrical power to a load forming part of a data center or server farm. It may be implemented for supplying electrical power to a microprocessor, a graphic processor or a memory set. Possibly, such microprocessor or a graphic processor may form itself the part of the data center or server farm which is power-supplied in accordance with embodiments herein. Alternatively, the power conversion performed according to embodiments herein may be a first power conversion stage used for supplying electrical power to a downstream power converter.

Note that any of the resources (such as predictor, regulator, etc.) as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein. One embodiment includes a computer readable storage medium and/or system having instructions stored thereon to provide power conversion. The instructions, when executed by computer processor hardware, cause the computer processor hardware (such as one or more co-located or disparately located processor devices) to: receive current collected samples of operational settings of the power converter; convert the current collected samples of operational settings of the power converter to control information, the control information being a machine-learned control response assigned to a pattern of previously stored samples of operational settings of the power converter; output the control information to control the multiple phases.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited to provide more efficient use of wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

These and other features of the invention will be now described with reference to the appended figures, which relate to preferred but not-limiting embodiments of the invention.

DETAILED DESCRIPTION

Figure 1:
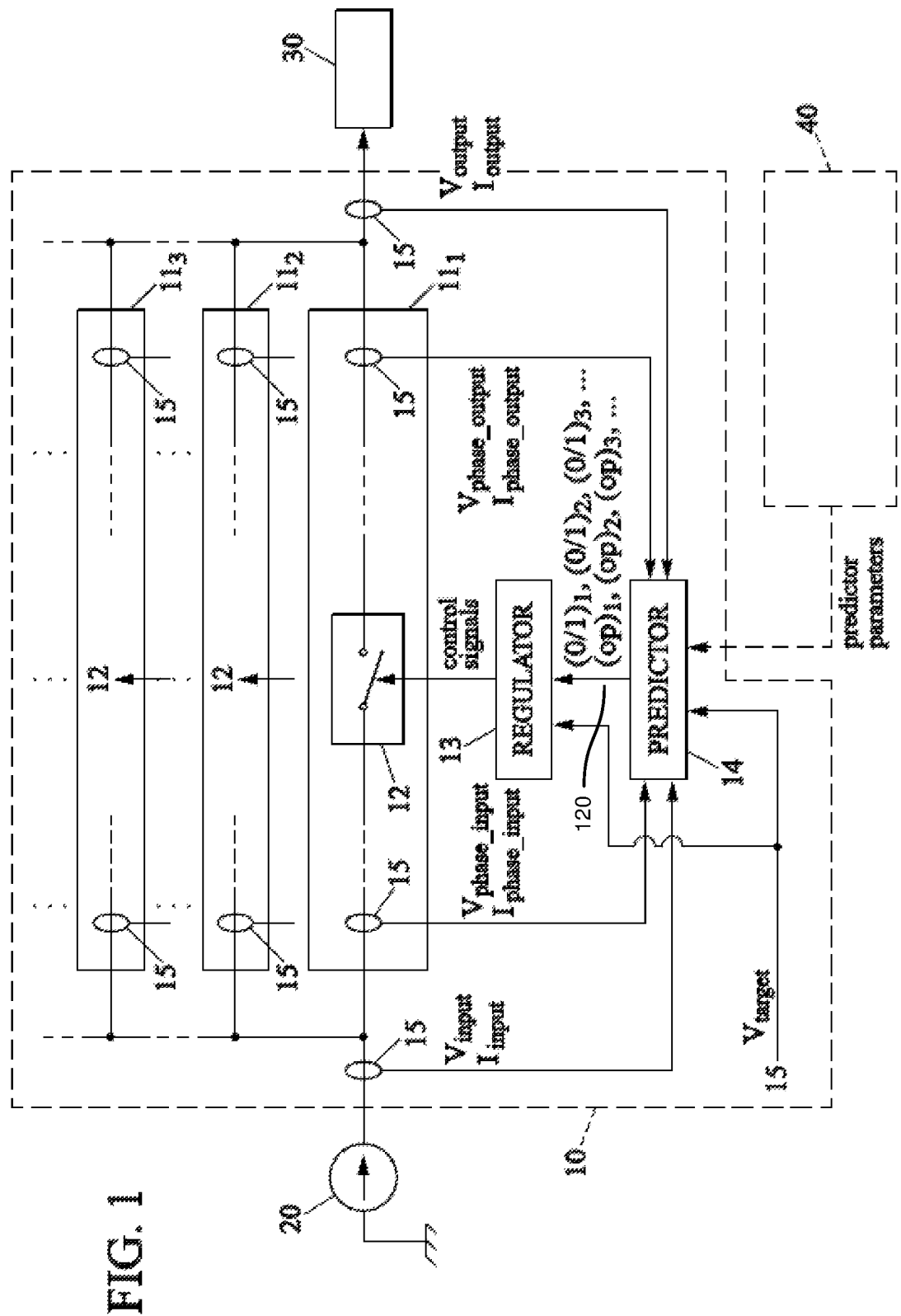
FIG. 1 is a diagram showing elements of a multiphase power converter according to embodiments herein.

For clarity sake, components and elements which are not directly concerned with embodiments herein are not described thereafter, given that one skilled in the art knows how to implement such components and elements.

For illustrative purpose but without limitation to such embodiment type, embodiments herein include a DC-DC power converter. But it should be understood that the power converter circuit and corresponding components can be implemented in any type of power converter, e.g. AC-DC, AC-AC, DC-AC, etc.

A DC-DC power converter in accordance with embodiments herein, can be used for supplying electrical power to one or more loads such as a computer mother-board, but preferably specifically to a processor, e.g. in a point-of-load configuration. For such a configuration, one converter is dedicated to one processor, and located next to it on a common printed circuit board.

The converter according to embodiments herein comprises several phases connected in parallel between an input of the converter and a load, i.e. the processor to be power-supplied in the present example. Each phase may comprise one or more switching device, which produce each a connecting state during on-periods and an isolating state during off-periods. Each switching device is operated through control signals, for example PWM (pulse-width modulation) signals or PFM (pulse-frequency modulation) signals, which are issued by a regulator. Preferably, one regulator is common to all the switching devices of one converter.

The regulator may be of any type including proportional regulators, integral regulators, derivative regulators, proportional-integral regulators, integral-derivative regulators, proportional-derivative regulators, proportional-integral-derivative regulators known as PID regulators, regulators which implement at least one higher order component for controlling the power conversion, delta-regulators, delta-sigma regulators, differential regulators, etc. It is only necessary for the invention that the regulator is able to activate or deactivate each one of the phases selectively during the power conversion. Such phase activations or deactivations may be implemented by the regulator through suitable control signals transmitted to the switching devices of the phases. For example such control signals may designate alternatively connecting state and isolating state for switching devices of a currently active phase, and may designate the isolating state only for all the switching devices of a currently inactive phase.

During operation, the converter receives an input current and an input voltage, denoted $I_{input}$ and $V_{input}$ respectively, from an external DC power source. For implementing embodiments herein, measured samples values of this input current $I_{input}$ and input voltage $V_{input}$ (at different sample times) may be collected repeatedly, for example every n-cycle operation period of the converter, n being a non-zero fixed integer.

The converter transforms this input current $I_{input}$ and input voltage $V_{input}$ into an output current $I_{output}$ and an output voltage $V_{output}$ which are transmitted to the load. Measured values of this output current $I_{output}$ and output voltage $V_{output}$ may also be collected for the same operation instants (same points in time).

Other values may also be measured, or instead some of the converter input/output voltage/current just mentioned, depending on the converter design. These other values may relate each to a current supplied to or issued by one of the phases, called phase input/output current and denoted $I_{phase\_input}$ or $I_{phase\_output}$, respectively. Similarly, a voltage supplied to or produced by one of the phases, called phase input/output voltage and denoted $V_{phase\_input}$ or $V_{phase\_output}$, respectively, may be used too. Such phase input/output current/voltage values may also be used for any phase in combination with some or all of the converter input values $I_{input}$ and $V_{input}$ and converter output values $I_{output}$ and $V_{output}$.

Collection of some or all of these measured values is performed by a value-supply system. This value-supply system gathers the measured values which relate to one same instant of operation of the converter into one value set which is called an operating point. Each operating point is further completed by the value-supply system with a target output voltage which also relates to the same operation instant as the measured values of this operating point. The target output voltage, denoted $V_{target}$, is used by the regulator for generating the control signals, so that the output voltage $V_{output}$ which is actually produced by the converter is close to the target output voltage $V_{target}$. Successive values of the target output voltage $V_{target}$ allow controlling variations in the instant output voltage which is supplied to the load, in particular depending on active periods or idle periods of modules internal to this load. They also allow controlling the converter output during transient periods which are intermediate between active and idle periods.

The value-supply system transmits each operating point to a predictor, which determines therefrom a status to be implemented for each phase by the regulator. This status indicates whether the phase of concern is to be activated or deactivated by the regulator. For example, the predictor may transmit the phase statuses to the regulator in form of a binary word, with each bit of the word relating to one of the phases, 0-value for said bit indicating that this phase is deactivated and 1-value that this phase is activated. Such control word then has the following form: $(0/1)_1$, $(0/1)_2$, $(0/1)_3$, . . . where $(0/1)_1$ is the bit value dedicated to specifying the status of a first one of the phases, $(0/1)_2$ is the bit value dedicated to specifying the status of a second one of the phases, $(0/1)_3$ is the bit value dedicated to specifying the status of a third one of the phases, etc. The predictor transmits the determined phase statuses to the regulator of the converter, so that this regulator implements these phase statuses. For instance, this implementation of the phase statuses may be carried out by controlling the switching devices of all phases from an instant subsequent to the status reception. In this way, the predictor sets the number of phases that are activated at each time during the power conversion.

According to an improvement of the invention, the predictor may also determine one or more phase operation parameter for each phase that is activated. This phase operation parameter may specify an operation of the phase being active. For example, the phase operation parameter may be a target value for the phase output current to be produced by this phase, a target output current, etc. Then, the regulator controls the switching devices of this phase so that its phase output current matches the target value for the corresponding operation parameter(s) related to it. In particular, using a phase operation parameter which indicates a decreasing target value for the phase output current may be used for dropping the phase of concern in a progressive way. In this manner, the phase operation parameter may be used for indicating a kind of phase status, with intermediate values between the status indicating that the phase is active and the opposite status indicating that the phase is inactive.

In FIG. 1, reference number 10 denotes the power converter, reference number 20 denotes the power supply which is connected to the input of the converter 10, and reference number 30 denotes the load which is connected to the output of the converter 10. In the particular example embodiment described here, the power supply 20 is of DC-type and the load may be a microprocessor, a memory, a laptop, a smartphone, a tablet, a LED light bulb, a TV, etc. Reference numbers $11_1$, $11_2$, $11_3$, . . . denote separate phases of the converter 10, whatever their number higher than one, and each reference number 12 denotes one switching device within each phase $11_1$, $11_2$, $11_3$, .... The internal structure of each phase $11_1$, $11_2$, $11_3$, ... is not represented in FIG. 1, and may be of any type known in the art. For example, it may be of buck converter type. For clarity of the figure, only one switching device 12 per phase has been represented. The other reference numbers are:

13: the regulator

14: the predictor

15: the value-supply system 15 (sensors or monitors that generate data) although respective components are distributed at several locations in the figure The regulator 13, the predictor 14 and the value-supply system 15 are part of the power converter 10 together with the phases $11_1$, $11_2$, $11_3$, ....

The value-supply system 15 may comprise one or more voltage sensors and/or one or more current sensors, such as usual voltage and/or current sensors, for example direct current resistors for sensing the currents. These sensors may be combined with sample-and-hold units and analog-to-digital converters to issue at least some of the measured values $V_{input}$, $I_{input}$, $V_{output}$, $I_{output}$, $V_{phase\_input}$, $I_{phase\_input}$, $V_{phase\_output}$, $I_{phase\_output}$ corresponding to common instants of operation for the converter 10. Advantageously, the sampling period may be a multiple of the switching period of the phases $11_1$, $11_2$, $11_3$, ..., but the sampling period may also be selected depending on the converter application, for instance so as to update the phase statuses sufficiently fast with respect to the load changes. The sampling period may also be selected depending on the power consumption caused by each value measurement and each update of the phase statuses.

The measured values for at least some of $V_{input}$, $I_{input}$, $V_{output}$, $I_{output}$, $V_{phase\_input}$, $I_{phase\_input}$, $V_{phase\_output}$, $I_{phase\_output}$, and the target output voltage $V_{target}$ are transmitted by the value-supply system 15 to the regulator 13 for operation of this latter in a manner as known before the present invention.

According to embodiments herein, in contrast to conventional techniques, the measured values for at least some of $V_{input}$, $I_{input}$, $V_{output}$, $I_{output}$, $V_{phase\_input}$, $I_{phase\_input}$, $V_{phase\_output}$, $I_{phase\_output}$, and the target output voltage $V_{target}$ are also transmitted to the predictor 14, which determines the phase statuses to be implemented by the regulator 13.

Operation of the predictor 14 is now described.

In one embodiment, the predictor 14 is a FIFO-queue-like memory set for storing a fixed number of operating points which relate to successive operation instants of the converter 10. For example, a further operating point is issued by the value-supply system 15 at the end of every sampling time. This further operating point is stored into an entrance cell of the FIFO-queue like memory set, and all the previously stored operating points are shifted by one cell in the queue toward the last memory cell. That one of the operating points which was stored in the last memory cell of the queue is dropped. The whole content of the memory set (collected data at multiple instances of time) is used for determining the next phase statuses. This allows anticipating events such as load changes, voltage changes and any possible event to occur by implementing in advance a number of active phases that is appropriate for such event.

For predicting the phase statuses in a way appropriate to each application, the predictor 14 implements an algorithm called machine-learning model. Such machine-learning model may be run within the predictor 14 as embedded software or directly in hardware, or any combination of both. This allows using a same silicon chip for any application of the converter 10. In particular, using a neuromorphic chip which implements a spiking neural network for the predictor 14 enables a very energy-efficient hardware implementation of the machine-learning model.

In one embodiment, a simple machine-learning model (such as a lookup table model) for the predictor 14 includes storing within the predictor, a number of operating points with associated phase statuses for all the phases of the converter 10. A series of successive operating points can be stored with associated phase statuses for all the phases. Then, each time the value-supply system 15 provides a series of actual operating points, an algorithm, such as a nearest-neighbor algorithm, determines which one of the stored operating point series (amongst multiple series of previously stored sample data associated with the power converter circuit) is the nearest to the series of actual operating points. More specifically, in one embodiment, the predictor matches (and/or maps) current measured operational settings of the multiple phases to a nearest matching prior measured set of operational settings (which is identified amongst multiple measured sets of operational settings of the multiple phases) to determine how to produce an appropriate machine-learned control response. Embodiments herein assume some level of repetitiveness in conditions associated with the multiple phases and that a desired response is predictable from the prior learned settings and corresponding mapped machine-learned control responses to produce the output voltage within a desired voltage range.

Figure 2:
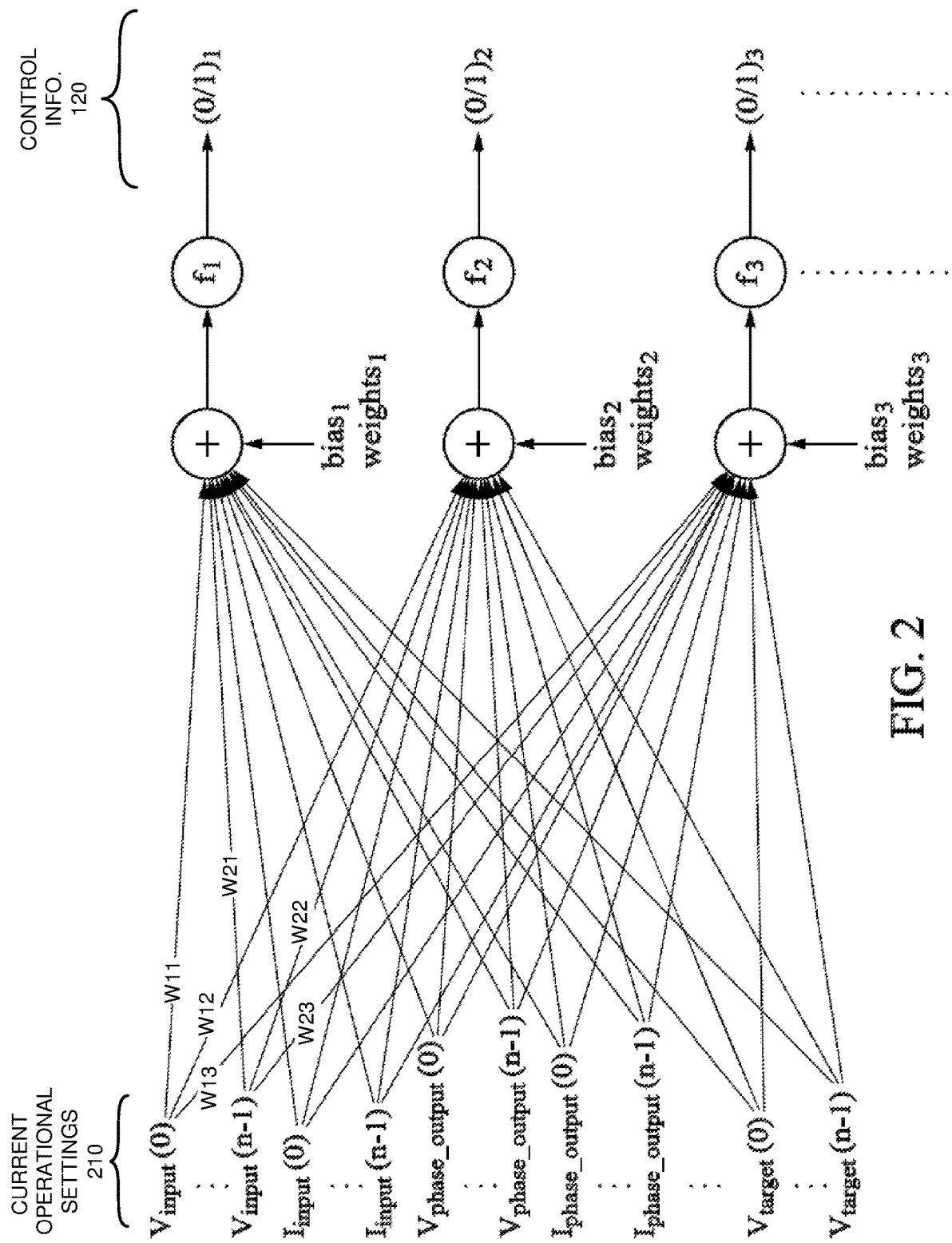
FIG. 2 is an example diagram illustrating a calculation sequence which may be implemented in a predictor within the multiphase power converter of FIG. 1 according to embodiments herein.

The difference between the actual operating point series (currently collected data sets or operational settings 210) and any one of the stored operating point series may be calculated using any norm commonly known in the art. When handling series of several successive operating points, as shown in FIG. 2, the norm may for instance be selected so as to weigh differently the operating points (e.g., weighted value W11 applied to Vinput(0), weighted value W12 applied to Vinput(1), weighted value W13 applied to Vinput(2), ...; weighted value W21 applied to Iinput(0), weighted value W22 applied to Iinput(1), weighted value W23 applied to Iinput(2), ...; weighted value W31 applied to Vphase_output(0), weighted value W32 applied to Vphase_output(1), weighted value W13 applied to Vphase_output(2), ..., and so on) in the difference calculation as a function of the duration elapsed from the instant of operation of each operating point.

The phase statuses (such as suggested control setting indicating a number of phases to activate) to be implemented are then those associated with the nearest one of the stored operating point series. For such implementation, the stored operating point series with associated phase statuses may be recorded in a lookup table (of multiple previously stored operational settings of the power converter circuit and corresponding control responses) which is stored internal to the predictor 14. They constitute so-called labelled training data, and also the predictor parameters that are used by the predictor 14 for inferring each new set of updated phase statuses. Such implementation of the invention is more appropriate when the converter 10 has to accommodate to a small number of operation schemes.

Another possible machine-learning model may be based on regression, classification methods and/or may use a neural network. Such regression-based implementation may allow avoiding important jumps in the number of active phases (for example reducing the number of phases from, for example, 8 activated phases to 4 activated phases too quickly) as those which may result from the above-described nearest-neighbor implementation. A minimum calculation structure to be implemented within the predictor 14 for such regression-based implementation is shown in FIG. 2. In one embodiment, it is commonly called perceptron of linear classifier type. To obtain the next status to be implemented by the regulator 13 for each of the phases $11_1$, $11_2$, $11_3$, . . . , all the measured values for at least some of $V_{input}$, $I_{input}$, $V_{output}$, $I_{output}$, and $V_{phase\_input}$, $I_{phase\_input}$, $V_{phase\_output}$, $I_{phase\_output}$ for some or all of the phases, and the target output voltage $V_{target}$, for all the operating points stored in the FIFO-queue memory set (such as storing cur operational settings 210) are multiplied with predetermined weights and added together and to predetermined bias.

The result of such combination is then taken as an input argument into an activation function dedicated to each phase. The result of the activation function is the next status to be implemented for this phase by the regulator 13. In one embodiment, each calculation structure of such type is a so-called feed-forward neuron, and one separate neuron is dedicated to control activation of each phase for the respective current operating conditions of the power converter circuit.

In FIG. 2, weights$_1$ and bias$_1$ are the predetermined weights and bias, respectively, that are used for that of the combinations of the measured values and target output voltage (Vinput values, Iinput values, Vphaseouput values, etc., in the left column of FIG. 2) which relates to the phase $11_1$; weights$_2$ and bias$_2$ are the predetermined weights and bias, respectively, that are used for that of the combinations of the measured values and target output voltage which relates to the phase $11_2$; weights$_3$ and bias$_3$ are the predetermined weights and bias, respectively, that are used for that of the combinations of the measured values and target output voltage which relates to the phase $11_3$; and so on.

In this example embodiment, for a current control cycle, $f_1$ is the activation function (indicating whether to activate the phase) for the phase $11_1$; $f_2$ is the activation function (indicating whether to activate the phase) for the phase $11_2$; $f_3$ is the activation function (indicating whether to activate the phase) for the phase $11_3$; and so on. Similar meaning applies separately for weights$_2$, bias$_2$, $f_2$ and weights$_3$, bias$_3$, $f_3$, . . . with respect to the phases $11_2$ and $11_3$, . . . .

Hidden layers may be added in a known manner within each neuron for determining each phase status in a sharper manner with respect to the operating points. The number of hidden neural layers, the number of operating points which are combined for each phase status determination, and also the determination frequency, are to be selected with respect to a balance between computational effort, prediction precision, and special features of each converter application, in particular relating to the load.

In FIG. 2, n is the number of operating points which are involved for each determination of the phase statuses, i.e. the number of operating points in each series. For the predictor 14 as described before, n is the length (number of samples) obtained over multiple successive sample times) of the FIFO-queue memory set (such as storing current operational settings 210). But the memory amount which is thus necessary when n increases and for a multiphase power converter may become important. Then, a way to reduce such memory amount is to store at least part of the history information, e.g. the operating points before the last one transmitted by the value-supply system 15 to the predictor 14, directly in the neuron network instead of the entrance FIFO-queue like memory set. Such neural network configuration is known in the art as recurrent neural network. Among such recurrent neural networks, long short-term memories may be preferred because they avoid vanishing or exploding gradients.

When implemented, the phase operation parameter for each one of the phases $11_1$, $11_2$, $11_3$, . . . with status indicating that this phase is to be activated by the regulator 13, may be determined by the predictor 14 using any appropriate algorithm, including algorithms based on machine-learning processes, in particular such as those just described for the phase statuses. The phase operation parameters are then transmitted by the predictor 14 to the regulator 13 with the phase statuses. In FIG. 1, the phase operation parameter intended for phase $11_1$ when active is denoted $(op)_1$, that for phase $11_2$ is denoted $(op)_2$, $(op)_3$ for phase $11_3$, . . . .

The weights and bias for all the phase statuses, and possibly also for all the phase operation parameters, are the predictor parameters as mentioned in the general part of this description. They are to be provided to the predictor 14 through a preliminary phase called training. Such training is preferably to be achieved by computational means 40 (see in FIG. 1) which are external to the predictor 14, because of the quite large computer resources that may be necessary for determining the predictor parameters from labelled training data. The computational means 40 may be provided as a separate computer or be accessed through the cloud. Such configuration for the computational means 40 that are used for the training phase is advantageous since these computational means may be shared between a large number of users, thereby allowing computational means that may be expensive to be implemented in a cost-effective manner. Each user can access the computational means for the initial training phase of the predictor of his power converter, and then his power converter can run for a long duration without requiring the computational means again.

The training phase mainly comprises the following three steps:
- forming sets of labeled training data, such as each set comprises a series of successive operating points of the converter with an associated status—active or inactive—for each phase. In this way, each set of labeled training data describes an operation sequence over time which is possible for the converter, including instant values for at least some of the input and output voltages and currents of the converter and the phase input and output voltages and currents, and also for the target output voltage. Respective desired statuses for all the phases are associated with each series of successive operating points. In the art, the desired phase statuses are called labels. The labeled training data may advantageously be selected in a manner appropriate with respect to the application contemplated for the converter 10, and in particular with respect to its load 30, for obtaining optimized operation of the converter later in its specific application;
- then the predictor parameters are determined by the computational means 40 using one of known machine-learning processes such as gradient descent, in particular a Newton's method, or a conjugate gradient algorithm, a statistic optimization method, in particular a genetic algorithm, or any process implementing back-propagation, etc; and
- the predictor parameters are transferred to the predictor 14 for this latter to determine later on the phase statuses using the predictor parameters. The transfer of the predictor parameters to the predictor 14 may be performed through value transfer or by writing corresponding firmware to be implemented within the predictor 14.

Then, running of the predictor 14 while the converter 10 is supplying the load 30 with electrical power is called inference of the phase statuses. The updated phase statuses are transferred to the regulator 13, so that this latter switches from a previously implemented set of phase statuses to the updated one.

Embodiments herein are now described with reference to FIG. 3, which ensures that the regulator 13 does not control one or several of the phases $11_1$, $11_2$, $11_3$, ... for producing a phase output current that will be too high. Indeed a phase output current which is too high may deteriorate the switching devices of the phase, or cause overheating of some components. To this end, the power converter 10 may comprise additionally a monitor module 16 and a comparator 17. For example, the monitor module 16 may be connected for receiving the values that have been collected by the value-supply system 15 for the output current of the converter 10, for all the operating points of the n-series currently handled by the predictor 14, i.e. $I_{output}(0)$, $I_{output}(1)$, ..., $I_{output}(n-1)$. The monitor module 16 then calculates a minimum value for the number of phases to be activated by the regulator 13, denoted $\#min_{phase}$, for example equal to $Max_{i=0,...,n-1}(I_{output}(i))/I_{single\_phase\_max}$, where $I_{output}(i)$ is the measured value of the converter output current for the i-th operating point in the FIFO-queue, and $I_{single\_phase\_max}$ is a stored value representing a maximum current allowed for being produced by each phase individually. The comparator 17 receives on the one hand the value $\#min_{phase}$ from the monitor module 16, and determines on the other hand a number of phases to be activated resulting from the phases statuses as outputted by the predictor 14, denoted #active_phase_14. If #active_phase_14 is higher than or equal to $\#min_{phase}$, the phase statuses as outputted by the predictor 14 are transmitted to the regulator 13 for implementation. If #active_phase_14 is less than $\#min_{phase}$, another run of the predictor 14 may be triggered, for determining a new set of phase statuses from the same series of operating points but with the constraint of the number of active phases being equal to or higher than $\#min_{phase}$.

Further in this example embodiment, the power converter 10 includes module 16 and comparator 17 to produce control information 120 outputted to the regular 13. In one embodiment, in a similar manner as previously discussed, the monitor module 16 is operative to: i) monitor an output current (such as most recent sample of the output current or multiple samples of the output current) supplied by the output voltage to the load 30, and ii) produce an output value 350 (such as how many phases to activate) based on the monitored output current (Ioutput(current). The output value 350 indicates a number of the multiple phases in the power converter 10 to be activated to produce the output voltage to power the load 30. The comparator 17 is further operative to: i) compare the output value 350 to the control information, and ii) derive a control setting (control information 120) from the comparison.

In accordance with further embodiments, the comparator 17 is operative to select, based on which is greater in magnitude, between the output value 350 and the control information 320 to derive the control information 120 supplied to the regulator 13.

Figure 4:
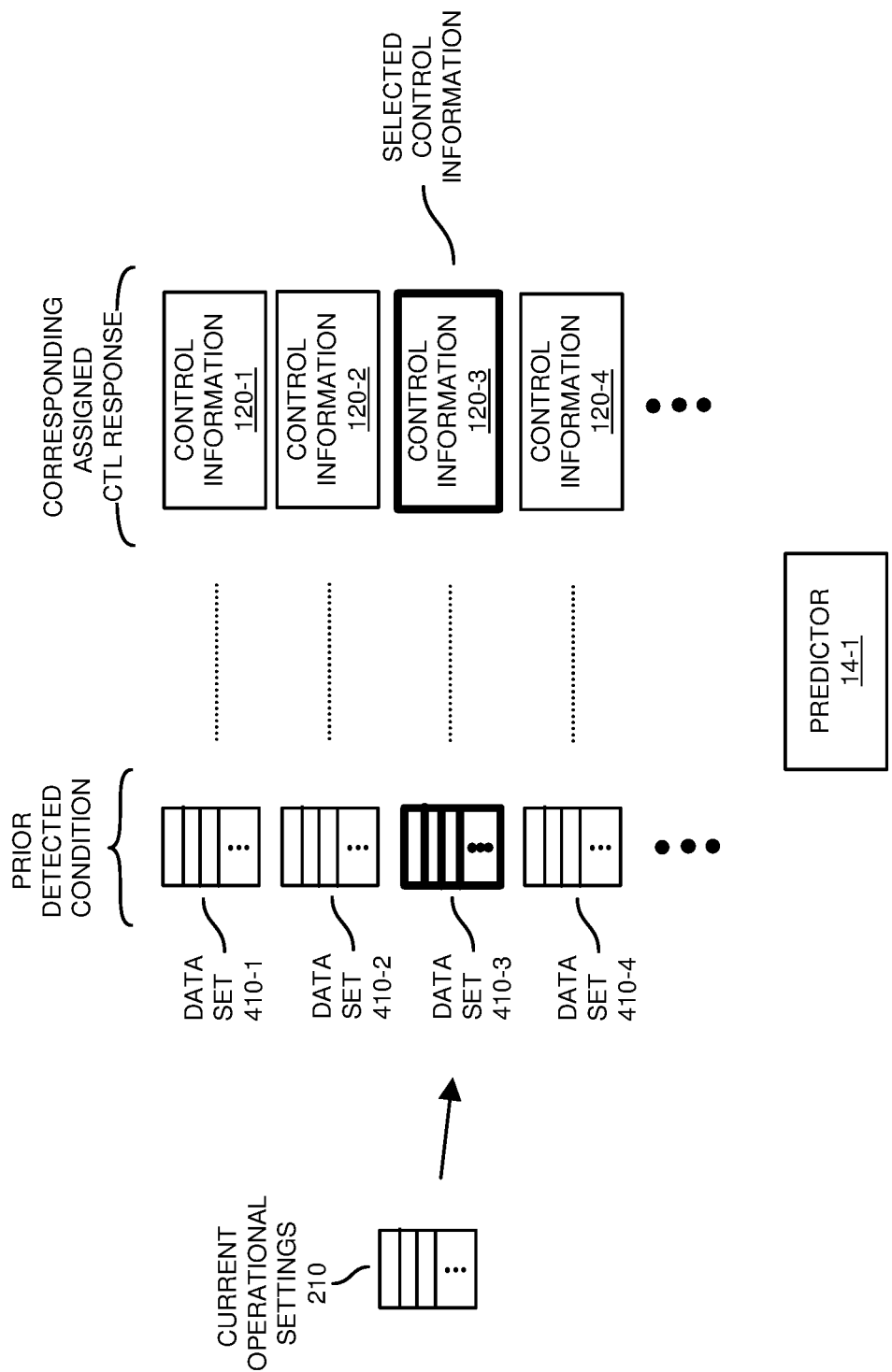
FIG. 4 is an example diagram illustrating mapping of current operating settings of a power converter to appropriate control information to achieve a desired control response according to embodiments herein.

FIG. 4 is an example diagram illustrating mapping of current operating settings of a power converter to appropriate control information to achieve a desired control response according to embodiments herein.

As previously discussed, the power converter 10 includes multiple phases; the regulator 13 controls the multiple phases, converting the input voltage to the output voltage.

In the example embodiment of FIG. 4, the instantiation of predictor 14-1 is operative to receive current collected samples of operational settings 210 of the power converter 10. Operational settings 210 are indicated as data set 410-1, data set 410-2, data set 410-3, etc.

Data set 410-1 (such as data stored in multiple FIFO buffers) is a first set of buffered samples obtained at different sample times for each of multiple parameters such as Vinput, Iinput, etc.

Data set 410-2 (such as data stored in multiple FIFO buffers) is a second set of buffered samples obtained at different sample times for each of multiple parameters such as Vinput, Iinput, etc.

Data set 410-3 (such as data stored in multiple FIFO buffers) is a third set of buffered samples obtained at different sample times for each of multiple parameters such as Vinput, Iinput, etc.; and so on.

Data set 410-4 (such as stored in a FIFO buffer) is a fourth sequence of buffered samples obtained at different sample times. The values in data set 410-4 measure a magnitude of the multiple monitored parameters over the different sample times; and so on.

Thus, the collected data samples include a respective sequence of multiple data samples for each of multiple parameters of the power converter collected over time.

As further shown, the predictor is operative to convert the current collected samples of operational settings 210 of the power converter 10 to appropriate control information 120. In one embodiment, the generated control information 120 is a machine-learned control response assigned to a pattern of previously stored samples of operational settings of the power converter 10.

In one embodiment, the current collected samples of operational settings 210 of the power converter 10 represent current operational conditions of the power converter 10. The previously stored samples of operational settings (such as data set 410-1 indicating a first prior operational condition of power converter 10, data set 410-2 indicating a second prior operational condition of power converter 10, data set 410-3 indicating a third prior operational condition of power converter 10, and so on.

In this example embodiment, based on prior machine learning, each of the different sets of prior detected conditions (operational settings 210) maps to a corresponding appropriate control response.

More specifically, for conditions (such as voltage/current settings) of the power converter 10 as indicated by data set 410-1, the control information 120-1 (such as indicating a number of phases to be activated to accommodate the current conditions) indicates a corresponding appropriate control response to control the power converter 10.

For conditions (such as settings) of the power converter 10 as indicated by data set 410-2, the control information 120-2 (such as indicating a number of phases to be activated to accommodate the current conditions/settings as specified by the data set 410-2) indicates a corresponding appropriate control response to control the power converter 10.

For conditions (such as settings) of the power converter 10 as indicated by data set 410-3, the control information 120-3 (such as indicating a number of phases to be activated to accommodate the current conditions/settings as specified by the data set 410-3) indicates a corresponding appropriate control response to control the power converter 10.

For conditions (such as settings) of the power converter 10 as indicated by data set 410-4, the control information 120-4 (such as indicating a number of phases to be activated to accommodate the current conditions/settings as specified by the data set 410-4) indicates a corresponding appropriate control response to control the power converter 10.

In this example embodiment, assume that the current operational settings 210 (for N samples) of the power converter 10 most closely resemble the settings as indicated by the data set 410-3. In other words, the current (recently) collected samples of operational settings 210 of the power converter 10 most closely match the pattern of previously stored samples of operational settings of the power converter 10. In such an instance, the predictor 14-1 maps data set 410-3 to the appropriate control response as indicated by the control information 120-3 for selection.

As previously discussed, in one embodiment, the generated control information 120 (derived from control information 120-3) indicates a number of the multiple phases to activate in the power converter for the previous operational conditions (associated with data set 410-3). Activation of the number of phases in the power converter 10 as specified by the control information 120 is operative to maintain the output voltage of the power converter 10 within a desired voltage range.

Subsequent to generating the control 120 (such as selected from control information 120-3), the predictor 14-1 outputs the control information 120 to the regulator 13 or other suitable resource to control the multiple phases.

Accordingly, in one embodiment, the predictor 14-1 is further operative to map the current collected samples of operational settings 210 of the power converter 10 to the previously stored samples of operational settings (such as data set 410-3) of the power converter 10 to identify and select the control information 120-3. The previously stored samples of operational settings (as indicated by the data set 410-3 are one of multiple sets of previously stored samples of operational settings (data sets 410) of the power converter.

Figure 5:
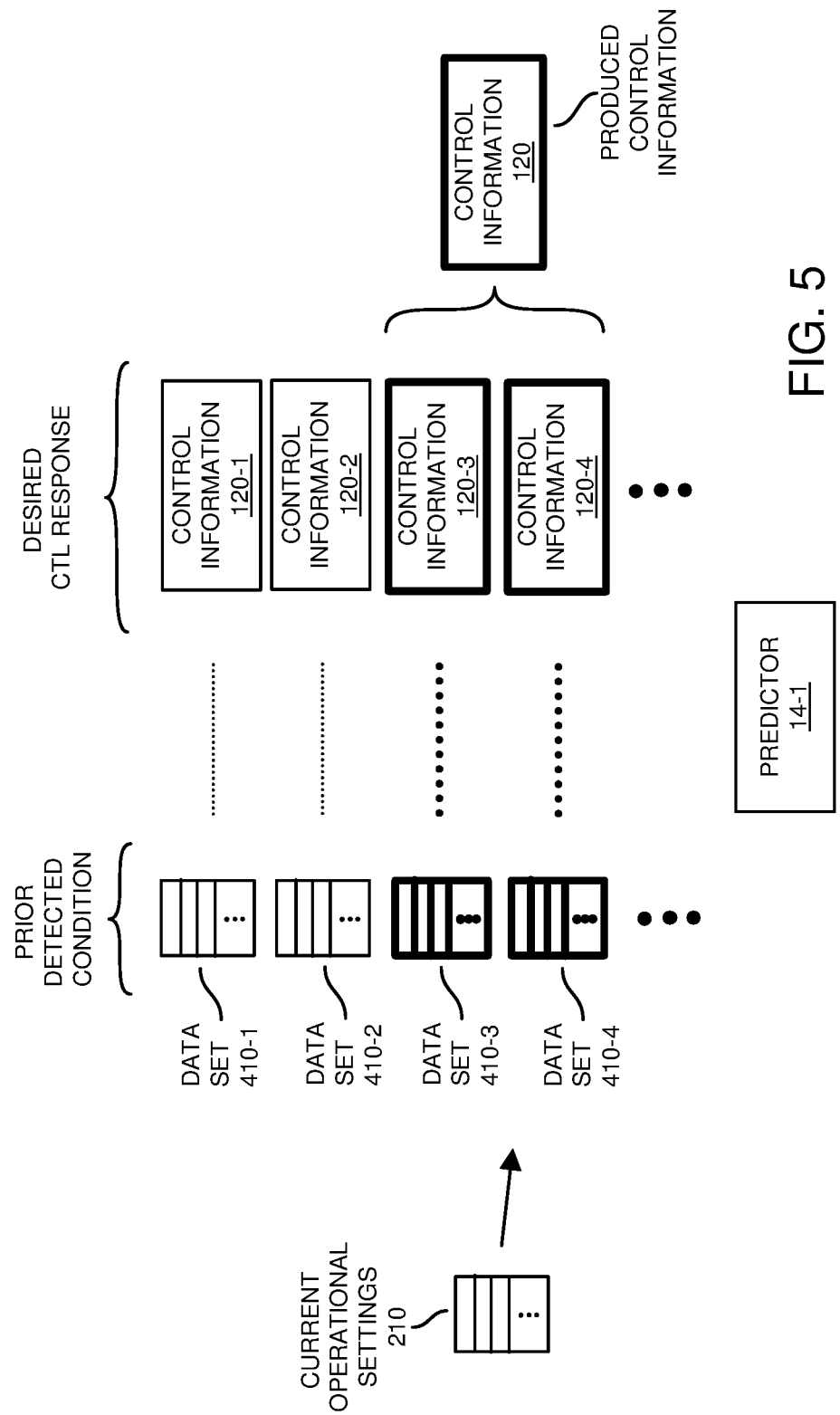
FIG. 5 is an example diagram illustrating mapping of current operating settings of a power converter to multiple sets of control information and derivation of control information from the multiple sets to achieve a desired control response according to embodiments herein.

FIG. 5 is an example diagram illustrating mapping of current operating settings of a power converter to multiple sets of control information and derivation of control information from the multiple sets to achieve a desired control response according to embodiments herein.

In this example embodiment, the predictor 14-1 identifies that the current operational settings 210 most closely match both the settings as specified by the data set 410-3 and settings as specified by the data set 410-4. In such an instance, the predictor 14-1 applies interpolation and/or extrapolation techniques to derive control information 120 from the combination of control information 120-3 and control information 120-4.

Figure 6:
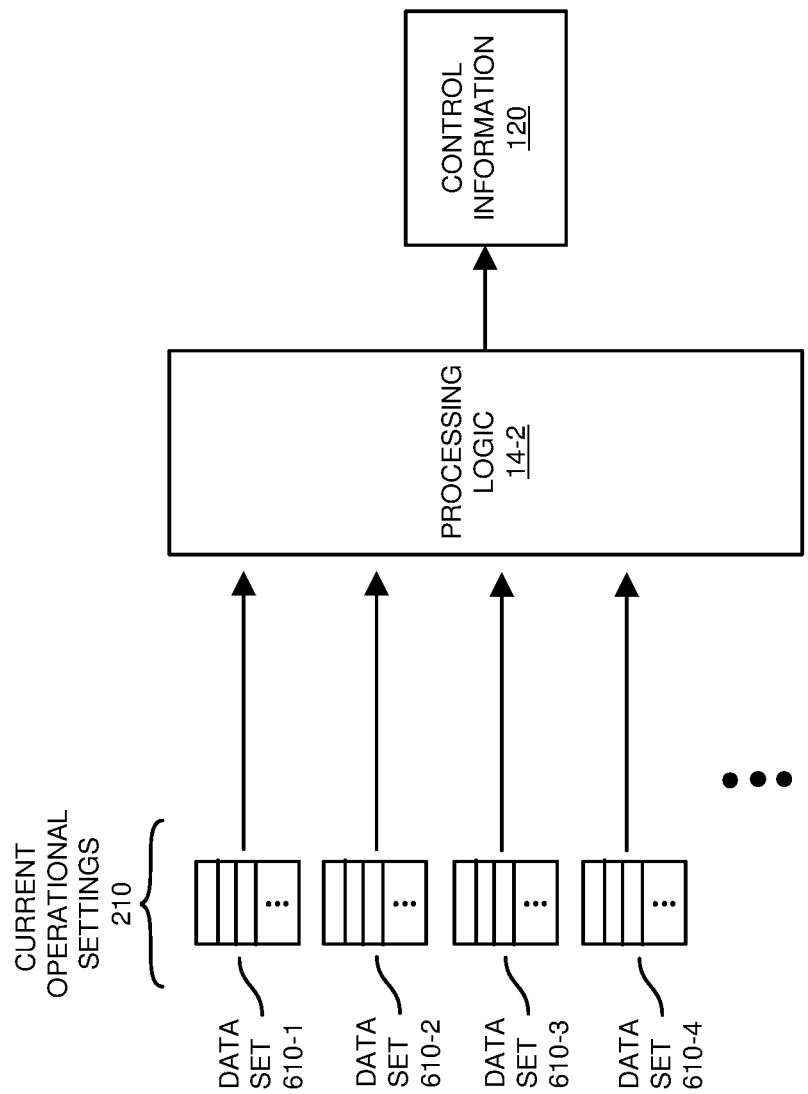
FIG. 6 is an example diagram illustrating use of logic to derive control information to control a power converter according to embodiments herein.

FIG. 6 is an example diagram illustrating use of logic to derive control information to control a power converter according to embodiments herein.

Figure 3:
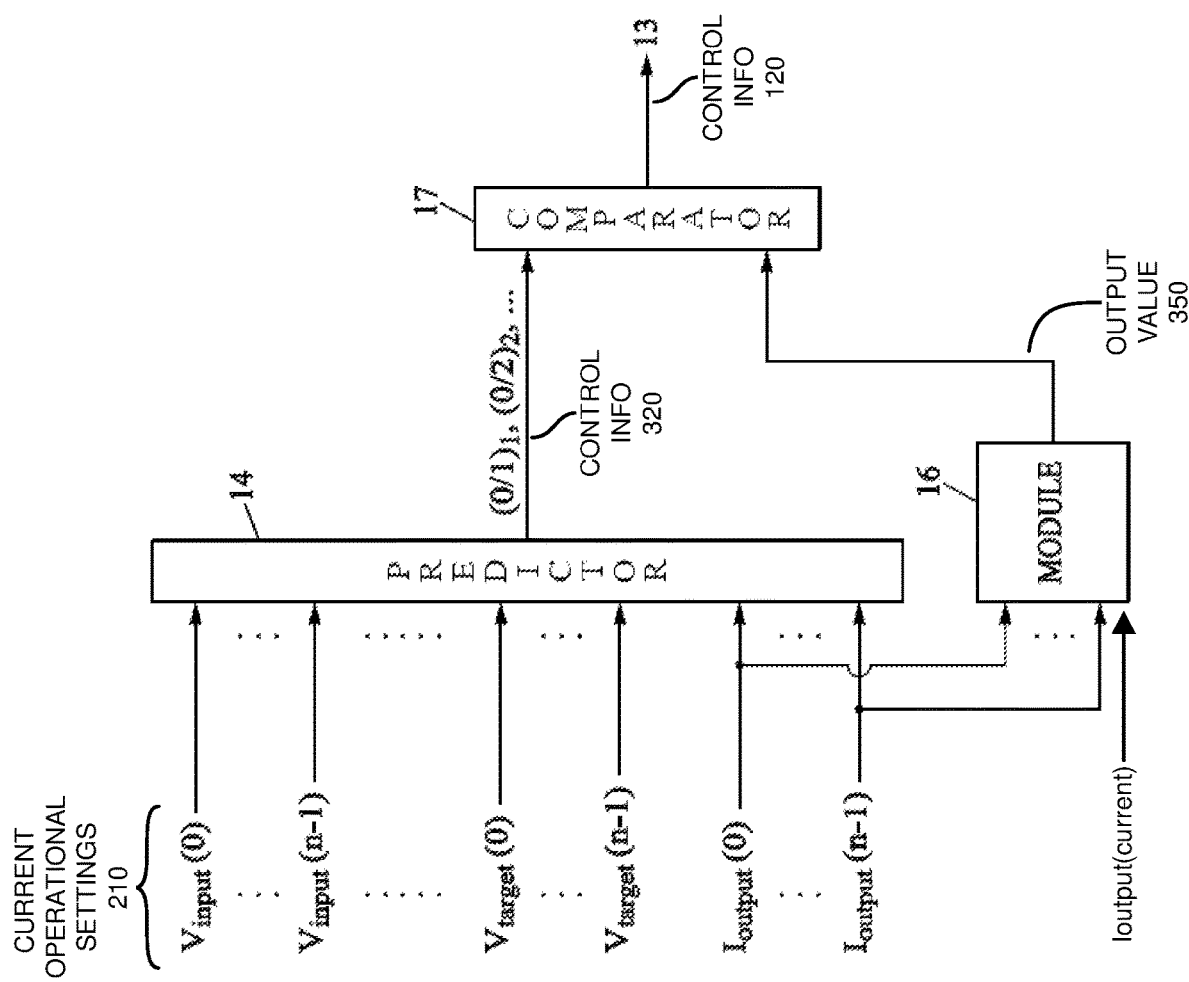
FIG. 3 is an example diagram illustrating an operation of a multiphase power converter according to embodiments herein.

In this example embodiment, similar to FIG. 3, the processing logic of predictor 14-2 receives current operational settings 210 of the power converter 10 such as stored in buffers 610 and derives control information 120 based on such information.

Buffer 610-1 stores samples of Vinput; buffer 610-2 stores samples of I input; buffer 610-3 stores samples of Vphase output; buffer 610-4 stores samples of Iphase_output; and so on.

Control information 120 indicates settings to apply to the regulator 13.

Figure 7:
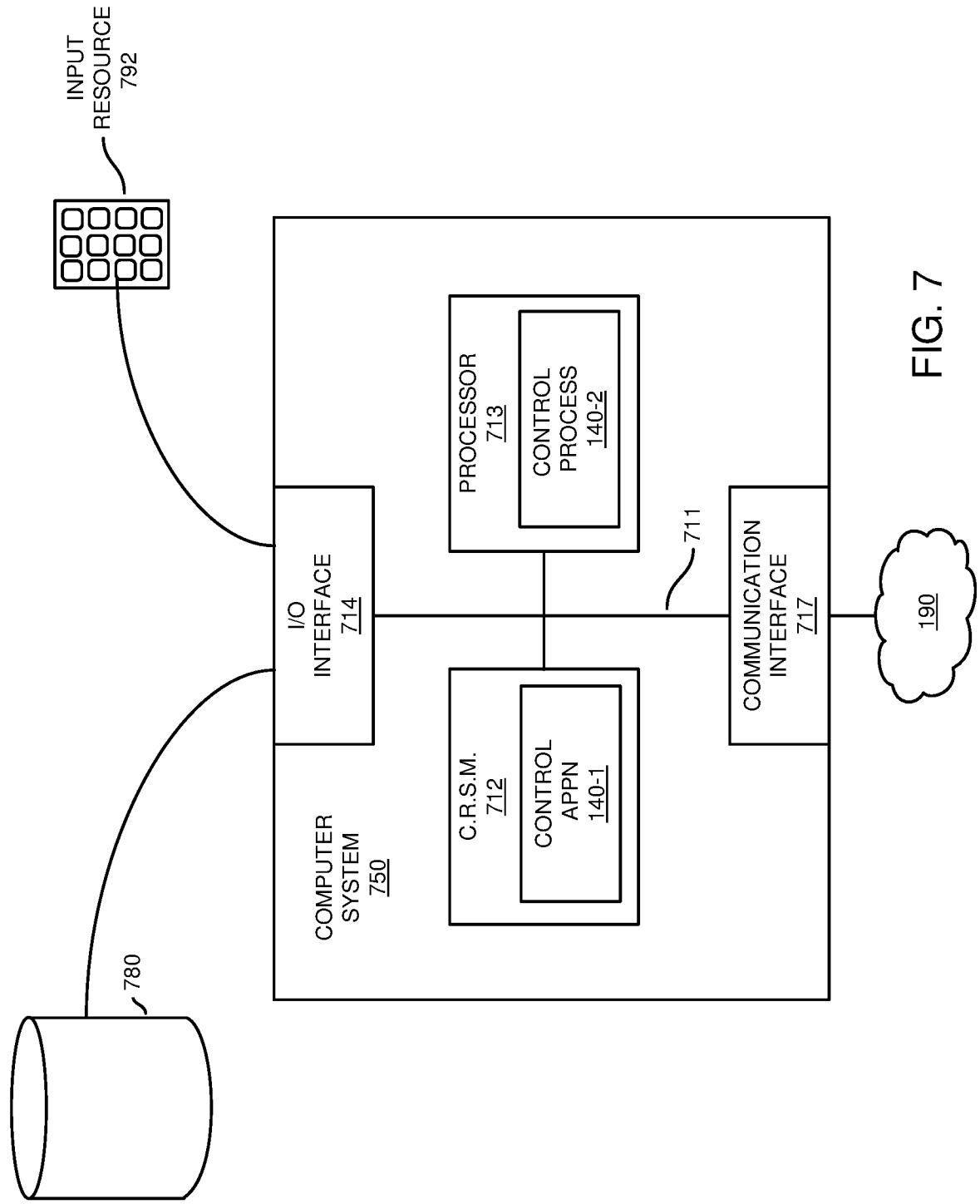
FIG. 7 is a diagram illustrating example computer architecture to execute one or more operations according to embodiments herein.

FIG. 7 is an example block diagram of a computer system for implementing any of the operations as previously discussed according to embodiments herein.

Any of the resources (such as predictor 14, regulator 13, etc.) as discussed herein can be configured to include computer processor hardware and/or corresponding executable instructions to carry out the different operations as discussed herein.

As shown, computer system 750 of the present example includes an interconnect 711 that couples computer readable storage media 712 such as a non-transitory type of media (which can be any suitable type of hardware storage medium in which digital information can be stored and retrieved), a processor 713 (computer processor hardware), I/O interface 714, and a communications interface 717.

I/O interface(s) 714 supports connectivity to repository 780 and input resource 792.

Computer readable storage medium 712 can be any hardware storage device such as memory, optical storage, hard drive, floppy disk, etc. In one embodiment, the computer readable storage medium 712 stores instructions and/or data.

As shown, computer readable storage media 712 can be encoded with communication management application 140-1 (e.g., including instructions) to carry out any of the operations as discussed herein.

During operation of one embodiment, processor 713 accesses computer readable storage media 712 via the use of interconnect 711 in order to launch, run, execute, interpret or otherwise perform the instructions in management application 140-1 stored on computer readable storage medium 712. Execution of the communication management application 140-1 produces communication management process 140 2 to carry out any of the operations and/or processes as discussed herein.

Those skilled in the art will understand that the computer system 750 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 750 may reside at any location or can be included in any suitable resource in any network environment to implement functionality as discussed herein.

Functionality supported by the different resources will now be discussed via the flowchart in FIG. 8. Note that the steps in the flowcharts below can be executed in any suitable order.

Figure 8:
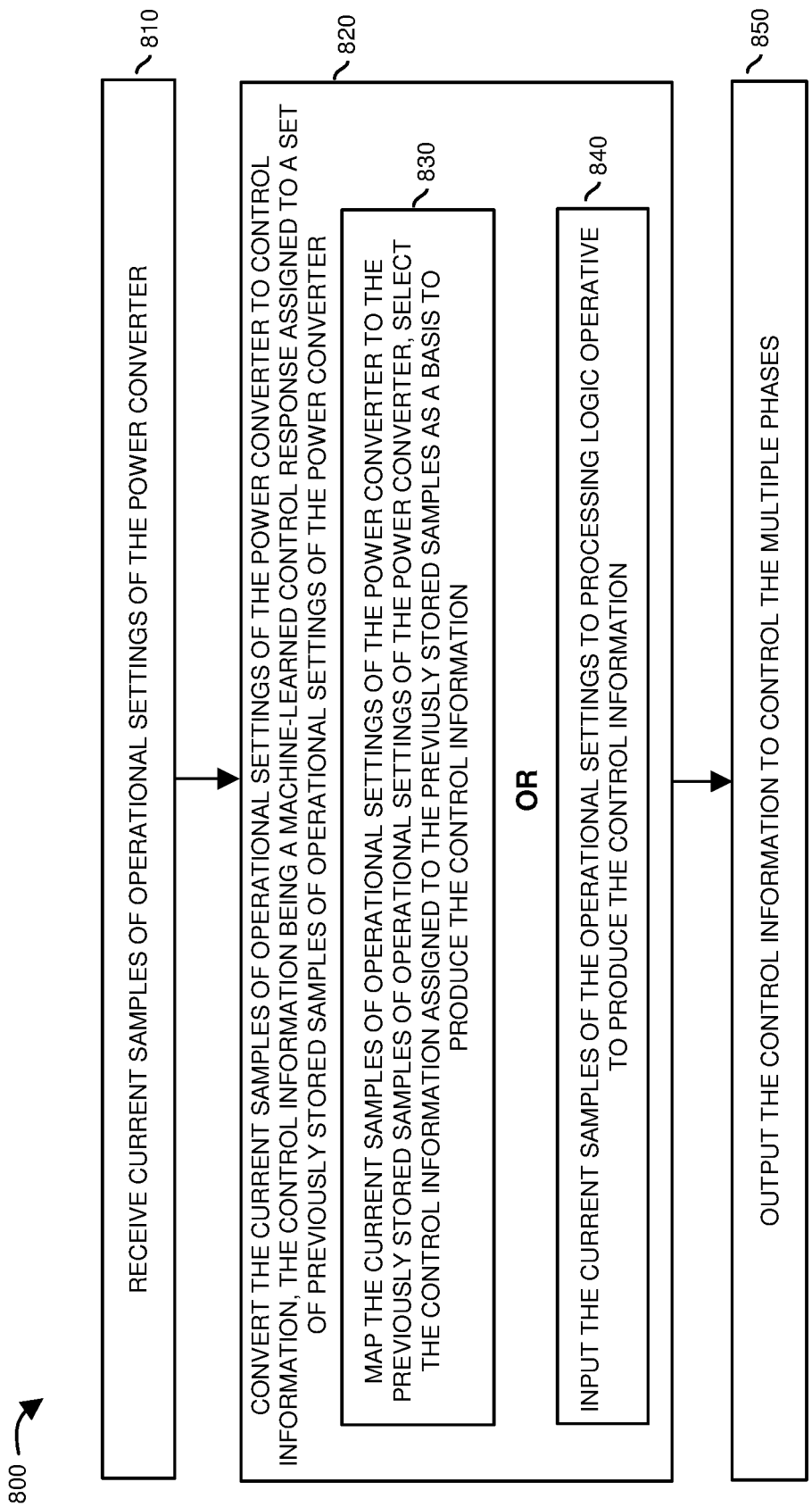
FIG. 8 is an example diagram illustrating methods according to embodiments herein.

FIG. 8 is a flowchart 800 illustrating an example method according to embodiments. Note that there will be some overlap with respect to concepts as discussed above.

In processing operation 810, the predictor 14 receives current collected samples of operational settings 210 of the power converter 10.

In processing operation 820, the predictor 14 converts the current collected samples of operational settings 210 of the power converter 10 to control information 120, the control information 120 being a machine-learned control response assigned to previously stored samples of operational settings (such as one or more data sets 410) of the power converter 10.

In processing operation 830 (such as a sub-operation of processing operation 820), the predictor 14 maps the current collected samples of operational settings 210 of the power converter 10 to the pattern of previously stored samples of operational settings (such as 410-3) of the power converter 10; the predictor 14 then select the control information 120-3 assigned to the pattern (settings 210) as a basis to produce the control information 120 communicated to the regulator 13.

In processing operation 840 (such as an alternative sub-operation of processing operation 820), the predictor 14 inputs the current samples of the operational settings 210 to logic 14-1, which produces the control information 120 from the received settings 210.

In processing operation 850, the predictor 14 outputs the control information 120 to control the multiple phases of the power converter 10.

Although the detailed description has been focused on predictor embodiments suitable for implementing nearest-neighbor or regression-based machine-learning models, one should understand that embodiments herein are not limited to these specific models, and others can be used alternatively. In particular, any regression variant and any sequence based on hidden Markov chains may be used.

One should also understand that embodiments herein are applicable to any electrical power conversion such as other than DC-DC, in particular AC-DC power conversion, although the detailed description has been focused on DC-DC power conversion for illustrative purpose.

Finally, one should further understand that the embodiments herein are compatible with any phase management system, in particular if this phase management system is provided through the training phase. For example, the phase management system may use a limited selection among the converter phases, so as to keep the non-selected phases as backup phases in case one phase within the selection has a breakdown or becomes malfunctioning.

The invention claimed is:

1. A power converter comprising a plurality of phases that collectively supply an output current and an output voltage to a load, the output current and the output voltage resulting from phase output currents and phase output voltages respectively provided by the phases, wherein the power converter further comprises:
    a regulator operative to convert an input voltage to the output voltage;
    a value-supply system operative to collect operating points, each operating point relating to an instant in time of operation of the power converter and comprising measured values, for a corresponding instant of operation, for one or more input parameters among an input current of the power converter, the input voltage of the power converter, phase input currents, phase input voltages, and for one or more output parameters among the output current, the output voltage, the phase output currents, the phase output voltages, and at least one value of a target output voltage assigned to said instant in time of operation of the power converter; and
    a predictor operative to provide, for each respective phase of the plurality of phases, a respective updated phase status indicating which of the plurality of phases is to be activated, the updated phase statuses being communicated to the regulator so that said regulator selectively activates each phase as indicated by the respective updated phase status, the predictor operative to determine the updated phase statuses using a process of mapping the operating points collected by the value-supply system to respective control information learned from a machine-learning process, the regulator operative to convert the input voltage to the output voltage via execution of the respective control information;
    wherein the predictor includes a FIFO queue to store the collected operating points and further operating points supplied by the value-supply system monitoring operation of the power converter, the FIFO repeatedly updated over each of multiple sample times; and
    wherein the predictor repeatedly produces the updated phase statuses based on operating points stored in the FIFO queue.

2. The power converter of claim 1, wherein the power converter is a DC-DC power converter.

3. The power converter of claim 1, wherein the predictor is operative to provide, for each phase, when the corresponding updated phase status indicates that said phase is to be active, an updated value for a phase operation parameter of said phase, the updated value of the phase operation parameter being destined for the regulator so that said regulator activates said phase in a manner so as to match said updated value of the phase operation parameter.

4. The power converter of claim 1, wherein the predictor comprises a lookup table for storing labelled training data, the predictor further operative to select one of said labelled training data as a nearest neighbor to said collected operating points.

5. The power converter of claim 1, wherein the predictor is further operative to implement at least one calculation step of regression-type, in a calculation sequence used for issuing the respective updated phase status for each phase from said operating points.

6. The power converter as in claim 1, wherein the predictor operates in a feed-forward artificial intelligence manner.

7. The power converter as in claim 6, wherein the predictor includes a neuromorphic chip.

8. The power converter as in claim 1, wherein the predictor operates as a single-layer neural network.

9. The power converter of claim 1 further comprising a module operative to determine a minimal number of the plurality of phases to be activated based on the measured value for the output current in each of said collected operating point, and the power converter is adapted so that the updated phase statuses to be implemented by the regulator lead to a number of active phases which is at least equal to said minimal number of phases to be activated.

10. The power converter as in claim 1, wherein the operating points include multiple samples of the output current supplied by the power converter to the load.

11. The power converter as in claim 1, wherein the plurality of phases include a first power converter phase and a second power converter phase, the predictor further comprising:
    a first circuit path including a first summer and a first control function associated with the first power converter phase, the first summer operative to produce a first output value supplied to the first control function based on application of first weights to the collected operating points, the first control function operative to produce first control settings to control the first power converter phase; and
    a second circuit path including a second summer and a second control function associated with the second power converter phase, the second summer operative to produce a second output value supplied to the second control function based on application of second weights to the collected operating points, the second control function operative to produce second control settings to control the second power converter phase.

12. The power converter as in claim 11, wherein the first control settings indicate to activate the first power converter phase; and
wherein the second control settings indicate to activate the second power converter phase.

13. The power converter as in claim 1, wherein the plurality of phases includes a first power converter phase and a second power converter phase, the predictor further comprising:
a first control function operative to produce a first control value based on application of first weights to the collected operating points, the first control value controlling the first power converter phase; and
a second control function operative to produce a second control value based on application of second weights to the collected operating points, the second control value controlling the second power converter phase.

14. A power converter comprising a plurality of phases that collectively supply an output current and an output voltage to a load, the output current and the output voltage resulting from phase output currents and phase output voltages respectively provided by the phases, wherein the power converter further comprises:
a regulator operative to convert an input voltage to the output voltage;
a value-supply system operative to collect operating points, each operating point relating to an instant in time of operation of the power converter and comprising measured values, for a corresponding instant of operation, for one or more input parameters among an input current of the power converter, the input voltage of the power converter, phase input currents, phase input voltages, and for one or more output parameters among the output current, the output voltage, the phase output currents, the phase output voltages, and at least one value of a target output voltage assigned to said instant in time of operation of the power converter; and
a predictor operative to provide, for each respective phase of the plurality of phases, a respective updated phase status indicating which of the plurality of phases is to be activated, the updated phase statuses being communicated to the regulator so that said regulator selectively activates each phase as indicated by the respective updated phase status, the predictor operative to determine the updated phase statuses using a process of mapping the operating points collected by the value-supply system to respective control information learned from a machine-learning process, the regulator operative to convert the input voltage to the output voltage via execution of the respective control information;
wherein the predictor is operative to determine the respective updated phase status for each phase based on a set of operating points which relate to successive respective instants of operation of the power converter, said set of operating points being a fixed number of operating points;
wherein the predictor is operative to implement a recurrent neural network, in particular a long short-term memory, so that each time a further operating point is supplied to the predictor by the value-supply system, said further operating point is added to the plurality of operating points in a FIFO-queue manner, so as to obtain an updated plurality of operating points to be used for issuing a further updated phase status for each phase.

15. An apparatus comprising:
a power converter including multiple phases, the multiple phases operative to convert an input voltage to an output voltage;
a regulator operative to control the multiple phases of the power converter; and
a predictor operative to:
i) receive current detected samples of operational conditions of the power converter;
ii) convert the current detected samples of operational conditions of the power converter to control information, the control information being a machine-learned control response assigned to a set of prior detected samples of operational conditions of the power converter to maintain the output voltage within regulation; and
iii) output the control information to control the multiple phases;
wherein the prior detected samples of operational conditions is a first pattern of FIFO samples obtained at different sample times, the control information assigned to the first pattern of FIFO samples; and
wherein the current detected samples of operational conditions is a second pattern of FIFO samples obtained at different sample times, the second pattern of FIFO samples matching the first pattern of FIFO samples assigned the control information.

16. The apparatus as in claim 15,
wherein the set of prior detected samples of operational conditions of the power converter indicate previous operational conditions of the power converter, the machine-learned control response assigned to the set of prior detected samples of operational conditions as the machine-learned response to maintain the output voltage within regulation.

17. The apparatus as in claim 16, wherein the control information indicates a number of the multiple phases to activate in the power converter for the previous operational conditions, activation of the number of phases in the power converter as specified by the control information operative to maintain the output voltage within a desired voltage range.

18. The apparatus as in claim 15, wherein the current detected samples of operational conditions of the power converter include a respective sequence of multiple data samples for each of multiple parameters of the power converter collected over time.

19. The apparatus as in claim 18, wherein the respective sequences of multiple data samples for the multiple parameters include:
a first sequence of buffered samples indicating a measured magnitude of the input voltage over multiple sample times;
a second sequence of buffered samples indicating a measured magnitude of input current provided by the input voltage over the multiple sample times;
a third sequence of buffered samples indicating a measured magnitude of the output voltage over the multiple sample times; and
a fourth sequence of buffered samples indicating a measured magnitude of output current provided by the output voltage to a load over the multiple sample times.

20. The apparatus as in claim 15 further comprising:
a monitor module operative to: i) monitor an output current supplied by the output voltage to a load, and ii) produce an output value based on the monitored output current, the output value indicating a number of the multiple phases in the power converter circuit to be activated to produce the output voltage to power the load; and
a comparator operative to: i) compare the output value to a phase activation value indicated by the control information, the phase activation value indicating how many of the multiple phases in the power converter to activate, and ii) derive a control setting from the comparison.

21. The apparatus as in claim 20, wherein the comparator is operable to select, based on which is greater in magnitude, between the output value and the phase activation value to derive the control setting, the control setting controlling how many of the multiple phases of the power converter to activate.

22. The apparatus as in claim 15, wherein the predictor is further operative to map the current detected samples of operational conditions of the power converter to the set of prior detected samples of operational conditions of the power converter to identify the control information, the set of prior detected samples of operational conditions of the power converter being one of multiple sets of prior detected samples of operational conditions of the power converter, each set of the prior detected samples of operational conditions assigned a respective machine-learned control response.

23. The apparatus as in claim 15, wherein the predictor is further operative to map the current detected samples of operational conditions of the power converter to the set of prior detected samples of operational conditions of the power converter.

24. The apparatus as in claim 23, wherein the regulator is operative to receive and execute the control information to maintain a magnitude of the output voltage.

25. The apparatus as in claim 24, wherein the current detected sample of operational conditions include:
a first sequence of buffered samples indicating a measured magnitude of the output voltage over multiple sample times.

26. The apparatus as in claim 23, wherein mapping the current detected samples of operational conditions of the power converter to the set of prior detected samples of operational conditions of the power converter includes matching, based on likeness, the current detected samples of operational conditions to the set of prior detected samples of operational conditions.

27. The apparatus as in claim 23, wherein the control information is first control information; and
wherein the set of prior detected samples of operational conditions is a first set of multiple sets of prior detected samples of operational conditions.

28. The apparatus as in claim 27, wherein the multiple sets of prior detected samples of operational conditions includes:
the first set of prior detected samples of operational conditions, the first control information being assigned to the first set of prior detected samples of operational conditions and providing a first control response; and
a second set of prior detected samples of operational conditions, second control information being assigned to the second set of prior detected samples of operational conditions and providing a second control response.

29. The apparatus as in claim 15, wherein the current detected samples of operational conditions of the power converter includes a first sequence of samples obtained at different sample times; and
wherein the set of prior detected samples of operational conditions of the power converter includes a second sequence of samples obtained at different prior sample times.

30. The apparatus as in claim 29, wherein the control information is a machine learned response to controlling the power converter based on conditions as indicated by the first sequence of samples.

31. The apparatus as in claim 15, wherein the predictor is operative to derive the control information via application of different weights to the current detected samples of operational conditions.

32. The apparatus as in claim 15, wherein the regulator is operative to receive and execute the machine-learned control response assigned to the set of prior detected samples of operational conditions of the power converter, execution of the machine-learned control response operative to regulate a magnitude of the output voltage.

33. The apparatus as in claim 15, wherein the set of prior detected samples of operational conditions of the power converter include first sample data derived from monitoring the power converter; and
wherein the current detected samples of operational conditions of the power converter include second sample data derived from monitoring the power converter.

34. The apparatus as in claim 33, wherein the predictor is further operative to map the second sample data to the first sample data.

35. The apparatus as in claim 15, wherein the set of prior detected samples of operational conditions of the power converter include first sample data derived from monitoring the power converter and second sample data derived from monitoring the power converter;
wherein the current detected samples of operational conditions of the power converter include third sample data derived from monitoring the power converter; and
wherein the predictor is further operative to map the third sample data to the first sample data and the second sample data.

36. The apparatus as in claim 35, wherein the predictor is further operative to produce the control information outputted to control the multiple phases based on first control information assigned to the first sample data and second control information assigned to the second sample data.

37. A power converter comprising a plurality of phases that collectively supply an output current and an output voltage to a load, the output current and the output voltage resulting from phase output currents and phase output voltages respectively provided by the phases, wherein the power converter further comprises:
a regulator operative to convert an input voltage to the output voltage;
a value-supply system operative to collect operating points, each operating point relating to an instant in time of operation of the power converter and comprising measured values, for a corresponding instant of operation, for one or more input parameters among an input current of the power converter, an input voltage of the power converter, phase input currents, phase input voltages, and/or for one or more output parameters among the output current, the output voltage, the phase output currents, the phase output voltages, and at least one value of a target output voltage assigned to said instant in time of operation of the power converter; and a predictor operative to provide, for each respective phase of the plurality of phases, a respective updated phase status indicating which of the plurality of phases is to be activated, the updated phase statuses being communicated to the regulator so that said regulator selectively activates each phase as indicated by the respective updated phase status, the predictor operative to determine the updated phase statuses using a process of mapping the operating points collected by the value-supply system to respective control information learned from a machine-learning process, the regulator operative to convert the input voltage to the output voltage via execution of the respective control information;

wherein the predictor is operative to implement a recurrent neural network via memory so that each time a further operating point is supplied to the predictor by the value-supply system, said further operating point is added to the plurality of operating points in a FIFO-queue manner, so as to obtain an updated plurality of operating points over time to be used for issuing a further updated phase status for each phase.

38. An apparatus comprising:

a power converter including multiple phases, the multiple phases operative to convert an input voltage to an output voltage;

a regulator operative to control the multiple phases of the power converter; and a predictor operative to:

i) receive current detected samples of operational conditions of the power converter;

ii) convert the current detected samples of operational conditions of the power converter to control information, the control information being a machine-learned control response assigned to a set of prior detected samples of operational conditions of the power converter to maintain the output voltage within regulation; and iii) output the control information to control the multiple phases;

wherein the predictor is operative to implement a recurrent neural network via FIFO memory in which the detected samples of operational conditions are updated with new samples of the operational conditions over time; and wherein the predictor is further operative to repeatedly update the control information used to control the multiple phases of the power converter based on the detected new samples of operational conditions stored in the FIFO memory.

* * * * *